United States Patent
Cheng et al.

(10) Patent No.: US 10,944,556 B2
(45) Date of Patent: *Mar. 9, 2021

(54) CARBON NANOTUBE PHYSICAL ENTROPY SOURCE

(71) Applicant: International Business Machines Corporation, Armonk, NY (US)

(72) Inventors: Pau-Chen Cheng, Yorktown Heights, NY (US); Shu-Jen Han, Cortlandt Manor, NY (US); Jianshi Tang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,254

(22) Filed: Feb. 25, 2019

(65) Prior Publication Data
US 2019/0190712 A1   Jun. 20, 2019

Related U.S. Application Data

(63) Continuation of application No. 15/219,422, filed on Jul. 26, 2016, now Pat. No. 10,225,082.

(51) Int. Cl.
| | |
|---|---|
| *G06F 21/00* | (2013.01) |
| *H04L 9/08* | (2006.01) |
| *G06F 7/58* | (2006.01) |
| *G06F 21/72* | (2013.01) |

(Continued)

(52) U.S. Cl.
CPC ............ *H04L 9/0869* (2013.01); *G06F 7/588* (2013.01); *G06F 21/72* (2013.01); *G09C 1/00* (2013.01);

(Continued)

(58) Field of Classification Search
CPC ... H04L 9/0869; H04L 2209/12; G06F 7/588; G06F 21/72
See application file for complete search history.

(56) References Cited

U.S. PATENT DOCUMENTS

| | | |
|---|---|---|
| 5,732,138 A | 3/1998 | Noll et al. |
| 7,930,333 B2 | 4/2011 | Vartsky et al. |

(Continued)

FOREIGN PATENT DOCUMENTS

| | | |
|---|---|---|
| JP | 2006293721 A | 10/2006 |
| WO | WO2015/016734 A1 | 2/2015 |
| WO | WO2015/047328 A1 | 4/2015 |

OTHER PUBLICATIONS

List of IBM Patents or Patent Applications Treated as Related, Feb. 11, 2019, 2 pages.

(Continued)

*Primary Examiner* — Jeffrey C Pwu
*Assistant Examiner* — Helai Salehi
(74) *Attorney, Agent, or Firm* — Stephen J. Walder, Jr.; Jeffrey S. LaBaw

(57) ABSTRACT

A random value generator is provided that comprises a carbon nanotube structure that generates a random output current in response to a voltage input. The random value generator includes a random value output circuit coupled to the carbon nanotube structure that receives the random output current from the carbon nanotube structure and generates a random output value based on the received random output current from the carbon nanotube structure.

21 Claims, 7 Drawing Sheets

(51) Int. Cl.
G09C 1/00 (2006.01)
H04L 9/06 (2006.01)
(52) U.S. Cl.
CPC ........ *H04L 9/0662* (2013.01); *H04L 2209/12* (2013.01)

(56) References Cited

U.S. PATENT DOCUMENTS

| | | | |
|---|---|---|---|
| 8,938,069 B2 | 1/2015 | Orshansky | |
| 9,660,806 B2* | 5/2017 | Haensch | H04L 9/0866 |
| 2003/0007443 A1 | 1/2003 | Nickel | |
| 2004/0078402 A1 | 4/2004 | Butler | |
| 2006/0062384 A1 | 3/2006 | Dondeti | |
| 2006/0239461 A1* | 10/2006 | Brickell | H04L 9/0869 380/268 |
| 2008/0012047 A1* | 1/2008 | Bertin | G11C 17/165 257/213 |
| 2015/0161415 A1 | 6/2015 | Kreft | |
| 2018/0034629 A1 | 2/2018 | Cheng et al. | |

OTHER PUBLICATIONS

Agrawal, Dakshi et al., "EM Side Channel(s): Attacks and Assessment Methodologies", 4th International Workshop on Cryptographic Hardware and Embedded Systems—CHES 2002, Revised Papers, Aug. 13-15, 2002, 42 pages.

Agrawal, Dakshi et al., "The EM Side-Channel(s)", Cryptographic Hardware and Embedded Systems—CHES 2002, vol. 2523 of the series Lectures Notes in Computer Science 2523, Feb. 17, 2003, pp. 29-45.

Barker, Elaine et al., "Recommendation for Randam Number Generation Using Deterministic Random Bit Generators", NIST National Institute of Standards and Technology, NIST Special Publication 800-90A, Rev. 1, Jun. 2015, 110 pages.

Chari, Suresh et al., "Towards Sound Approaches to Counteract Power-Analysis Attacks", Advances in Cryptology—CRYPTO' 99, vol. 1666 of the series Lecture Notes in Computer Science, Dec. 16, 1999, pp. 398-412.

Jun, Benjamin et al., "The Intel Random Number Generator", Cryptography Research, Inc., White Paper Prepared for Intel Corporation, Apr. 22, 1999, 8 pages.

Konigsmark, S. T. Choden et al., "CNPUF: A Carbon Nanotube-based Physically Unclonable Function for Secure Low-Energy Hardware Design", http://www.aspdac.com/aspdac2014/technical_program/pdf/1C-2.pdf, Jan. 21, 2014, 25 pages.

Shannon, C.E., "A Mathematical Theory of Communication", The Bell System Technical Journal, vol. 27, pp. 379-423, 623-656, Jul., Oct. 1948, 55 pages.

\* cited by examiner

CARBON NANOTUBE PHYSICAL ENTROPY SOURCE

This application is a continuation of application Ser. No. 15/219,422, filed Jul. 26, 2016, status awaiting publication.

BACKGROUND

The present application relates generally to an improved data processing apparatus and method and more specifically to mechanisms for providing a physical entropy source that utilizes carbon nanotubes.

Cryptographic operations have become increasingly more important for protecting information in modern information systems. Nearly all cryptographic operations require the use of strong cryptographic keys, e.g., a secret random number or alphanumeric value, used as a basis for performing a cryptographic function based on the cryptographic key. The strength of a cryptographic key comes from the probability that the key may be discovered by an unauthorized entity. Often the strength is tied to the length and complexity of the cryptographic key.

A strong cryptographic key, or any part of a strong cryptographic key, should be nearly impossible to guess or predict using any other information. This means a strong cryptographic key should be independent of any other information including, but not limited to, any strong cryptographic key that was produced or utilized before, and any strong cryptographic key that will be produced in the future.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a random value generator is provided that comprises a carbon nanotube structure that generates a random output current in response to a voltage input. The random value generator further comprises a random value output circuit coupled to the carbon nanotube structure that receives the random output current from the carbon nanotube structure and generates a random output value based on the received random output current from the carbon nanotube structure.

In some illustrative embodiments, the carbon nanotube structure comprises at least one carbon nanotube field effect transistor (CNT-FET). In some illustrative embodiments, each CNT-FET in the at least one CNT-FET comprises a carbon nanotube positioned between a dielectric and a gate, and a first end of the carbon nanotube is associated with a source and a second end of the carbon nanotube is associated with a drain. In other illustrative embodiments, in response to the voltage input being applied to the gate of the CNT-FET, the carbon nanotube generates a random current output due to sensitivity of the carbon nanotube to trap charges absorbed by the dielectric near or on a surface of the carbon nanotube.

In still further illustrative embodiments, the random value output circuit comprises a first circuit to convert the random output current to a random voltage, and a second circuit to compare the random voltage to at least one reference voltage, and generate an output based on results of the comparison. The output is at least one portion of the random output value.

In another illustrative embodiment, the at least one CNT-FET comprises a plurality of CNT-FETs arranged in parallel, and wherein each CNT-FET in the plurality of CNT-FETs outputs a separate random value which is combined with other random values of other CNT-FETs in the plurality of CNT-FETs to generate the random output value. In still further illustrative embodiments, the random output value comprises at least one random bit value. Moreover, in some illustrative embodiments, the random value generator comprises an output connection connecting the random value generator to a logic element that converts the at least one random bit value to a symbolic output.

In other illustrative embodiments, an apparatus is provided that comprises at least one random value generator and a logic circuit element coupled to the at least on random value generator. The logic circuit element receives a random value output from the at least one random value generator and performs an operation based on the random value output. Each of the at least one random value generator comprises a carbon nanotube structure that generates a random output current in response to a voltage input and a random value output circuit coupled to the carbon nanotube structure that receives the random output current from the carbon nanotube structure and generates a random output value based on the received random output current from the carbon nanotube structure. In some illustrative embodiments, the logic circuit element comprises a cryptographic processor that performs a cryptographic operation based on the random output value generated by the at least one random value generator.

In another illustrative embodiment, a method is provided, in an integrated circuit device, for performing a logic operation based on a randomized output. The method comprises applying a voltage to a carbon nanotube (CNT) based physical entropy source to generate a randomized current output and generating, by a circuit coupled to the CNT based physical entropy source, a random output value based on the generated randomized current output received from the CNT based physical entropy source. The method further comprises inputting, by the logic circuit, the randomized output to a logic circuit element that performs a logic operation based on the randomized output.

In still other illustrative embodiments generating the random output value comprises converting, by an operational amplifier of the circuit, the randomized current output to a randomized output voltage, comparing, by a comparator coupled to the operational amplifier, the randomized output voltage to at least one reference voltage, and generating, by the comparator, an output signal representing at least a portion of the random output value based on results of the comparison.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
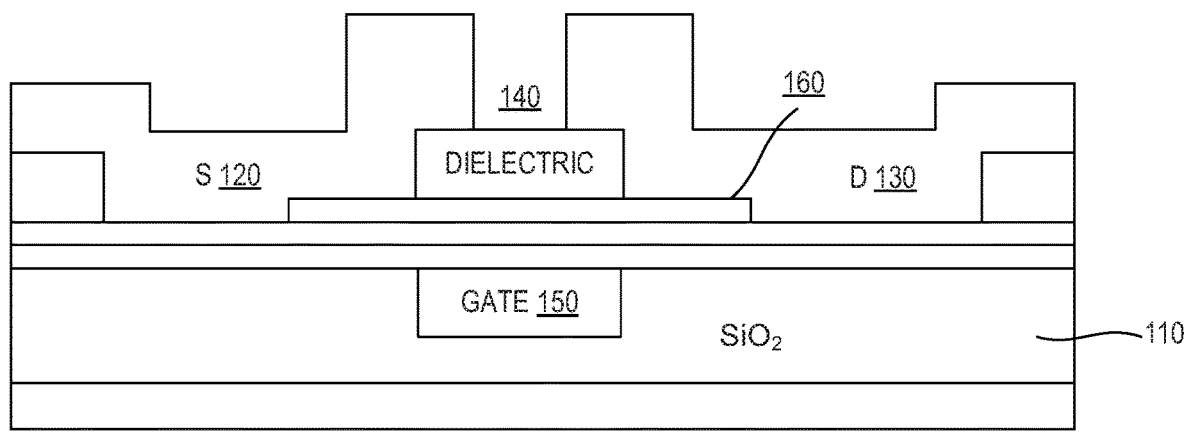
FIG. 1 is an example diagram of a CNT-based field-effect transistor (FET) which may be used as a physical entropy source in accordance with one illustrative embodiment.

As noted above, it is desirable in cryptographic operations to have strong cryptographic keys that are nearly impossible to guess or predict using any other information. Many times strong cryptographic keys are generated using mechanisms for randomly, or pseudo-randomly, generating these cryptographic key values. A cryptographic key's degree of randomness may be measured by its entropy as defined in information theory, also referred to as Shannon entropy, introduced by the mathematician Claude E. Shannon in a 1948 paper "A Mathematical Theory of Communication," The Bell System Technical Journal, vol. 27, pp. 379-423, 623-656, Jul., Oct. 1948.

A strong cryptographic key may be derived by measuring a non-deterministic, highly irregular, and very hard to predict physical process. These physical processes may be referred to herein as physical entropy sources, examples of which may be nuclear decay, thermal noise, avalanche noise, images of lava lamps, etc. Various mechanisms have been devised for using such physical entropy sources or chaotic systems as a basis for generating a strong cryptographic key. For example, U.S. Pat. No. 5,732,138 utilizes lava lamps as a physical entropy source while Intel Corporation has designed and manufactured physical entropy sources using thermal noise.

With continuous advances of microelectronics, small, miniaturized electronic devices are being used more often for information collection (e.g., sensors), processing, and transmission. Much of the information that is collected, processed, and transmitted may be sensitive in nature and may even be critical, such as real-time measurements of a power grid or a nuclear power plant, for example. Thus, it is important to protect such information with cryptographic operations. Therefore, these microelectronic devices need to have strong cryptographic keys for the cryptographic operations. However, due to these devices being extremely small in size and having limited resources, including but not limited to storage capacity, processing power, and energy sources (e.g., batteries), many of the physical entropy sources in existing mechanisms are not suitable for these small microelectronic devices. That is, many of the existing mechanisms have sizes, weights, and energy consumption requirements that are not conducive for use with microelectronic devices.

The illustrative embodiments provide mechanisms for using carbon nanotubes (CNTs) as a physical entropy source that is used to generate cryptographic keys or other random values. A CNT is an allotrope of carbon that takes the form of cylindrical carbon molecules and have the properties that make them potentially useful in a wide variant of applications in nanotechnology, electronics, optics, and other fields of materials science. In particular, owing to their extraordinary thermal conductivity and mechanical and electrical properties, CNTs find applications as additives to various structure materials, e.g., CNTs form a small portion, such as carbon fibers, in baseball bats, golf clubs, car parts, and Damascus steel. Currently, CNTs may be constructed with length-to-diameter ratios of up to 132,000,000:1.

In accordance with one illustrative embodiment of the present invention, a CNT based field-effect transistor (FET) is provided that may be utilized with additional circuitry that may be used to generate a cryptographic key or other random value based on the operation of the CNT based FET. When a voltage is applied to a gate of the CNT of the CNT based FET, a current flows through the CNT. The magnitude of this current depends on the gate voltage, but it is not a constant given the same gate voltage. To the contrary, the current is irregular and not very predictable. Repeated experiments show that the magnitude of the current shows a hysteresis pattern in a current-voltage plot. If the voltage is repeatedly applied to the gate and removed, with measurement of the current when the voltage is applied, a sequence of values is obtained from which a random value may be generated. The random value may be used as a cryptographic key, as a secret seed to a pseudorandom number generator which may generate one or more pseudorandom numbers that can be used as cryptographic keys, or to provide a random value for any other mechanism that utilizes random values.

Some of the many benefits that may be achieved by utilizing CNTs as physical entropy sources include the CNT physical entropy source consuming only a very small amount of energy and the CNT physical entropy source is of very small size and can be easily integrated into microelectronic circuits, such as a microprocessor on a single chip, with the CNT being about 1 nanometer in diameter. In addition, the secrecy of the generated random numbers is protected by chip integration because an attempt to observe the CNT-based physical entropy source from outside the chip, e.g., through a reverse engineering process that involves layer removal, would destroy the chip and thus, the CNT-based physical entropy source as well. The chip integration protects the integrity of the random numbers by protecting the link between the CNT-based physical entropy source and the circuit such that an attempt to subvert the link would destroy the chip and thus, the CNT-based physical entropy source. The CNT-based physical entropy source also offers the ability to perform design tradeoff determinations among the number of CNTs, and therefore the size of the area and the energy consumption of the CNTs as well as the time needed to collect the bits of the random numbers, and the amount of entropy that the CNT-based physical entropy source can provide.

In some illustrative embodiments, rather than measuring a single CNT many times by applying the voltage repeatedly and measuring the current when the voltage is applied, an array of multiple CNT based FETs may be used. In such an embodiment, multiple CNTs may be provided in parallel and have a voltage applied to their gates with each CNT generating a separate independent random value that may be combined with the random values of the other CNTs to generate a sequence of random values that can be used as noted above to generate a random number which can be the basis for a cryptographic key or any other random number input.

In some illustrative embodiments, in order to provide additional security against potential side channel attacks, an array of CNTs configured in parallel may be utilized in which only a subset of the measurements of the CNTs are used as the entropy source. The particular subset of measurements used may themselves be randomly or pseudo-randomly selected. Thus, even if an interloper were to identify the way in which the circuitry is implemented, the interloper will not be able to identify the particular subset of measurements selected at any one time. Of course, other configurations and arrangements of one or more CNT-based physical entropy sources may be used without departing from the spirit and scope of the illustrative embodiments.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or may comprise aspects of a computer program product. The computer program product may include a computer readable storage medium (or media) having computer readable program instructions thereon for causing a processor to carry out operations based on the random values, cryptographic keys, or the like, generated by the CNT-based physical entropy source mechanisms of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an example diagram of a carbon nanotube (CNT)-based field-effect transistor (FET) which may be used as a physical entropy source in accordance with one illustrative embodiment. As shown in FIG. 1, the example CNT-based FET 100 comprises, on a substrate 110, such as a silicon dioxide ($SiO_2$) or silica substrate, a source (S) 120, a drain (D) 130, a dielectric 140, a gate (G) 150, and the CNT 160. In the example diagram the CNT 160 is provided between the dielectric 140 and the gate 150 on the substrate 110, with opposite ends of the CNT 160 being configured as adjacent to the source 120 and drain 130. While a single gate is shown in FIG. 1, multiple gates could be utilized and the particular configuration shown in FIG. 1 may be modified as will be readily apparent to those of ordinary skill in the art in view of the present description, without departing from the spirit and scope of the illustrative embodiments.

Due to the small diameter of the CNT 160, the CNT-based FET 100 is very sensitive to trap charges absorbed by the dielectric 140 near or on the CNT 160 surface. With non-perfect passivation and with certain bias conditions, the CNT-based FET device 100 exhibits a large current variation, thereby given a random output. This large variation originates from the small semiconductor body of the CNT (~1-2 nm in diameter). Therefore, any charge absorbed near the CNT can cause large device threshold voltage shifts as well as subthreshold swing variation, leading to a large output current variation. Thus, by applying a voltage across the gate 150, the CNT electrical conductivity properties and sensitivity to trap charges cause a random output to be generated which can then be used to generate a random number that can be used as a basis for generating a random cryptographic key for use by a cryptographic operation.

Figure 2:
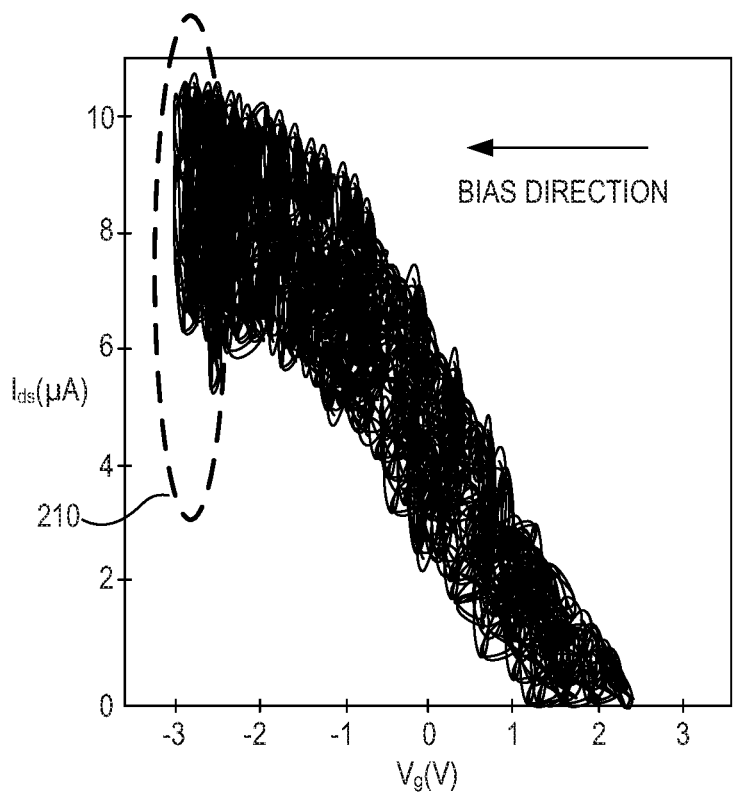
FIG. 2 is an example plot of current versus voltage from drain to source for a CNT-based FET in accordance with one illustrative embodiment.

FIG. 2 is an example plot of current versus voltage from drain to source for a CNT-based FET, such as that shown in FIG. 1, in accordance with one illustrative embodiment. As shown in the region 210, the current $I_{ds}$ generated by a bias voltage $V_g$ across the gate of the CNT-based FET of −3V has a large random variation ranging from between approximately 4.5 µA (at approximately −2.5V) to approximately 10.5 µA (at approximately −3V). This large random variation increases in the bias direction.

Figure 3:
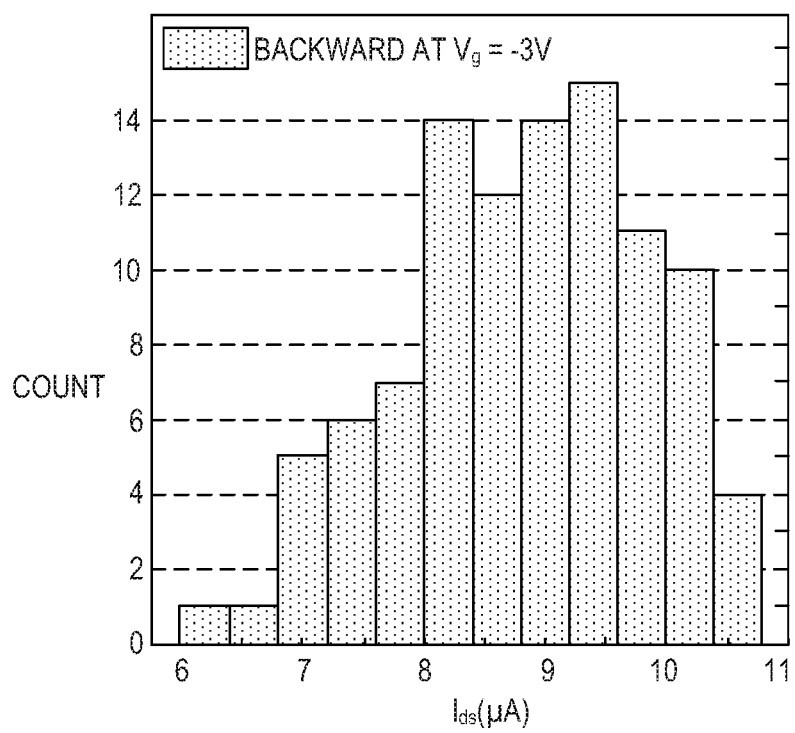
FIG. 3 is an example plot of current from drain to source of a CNT-based FET for a given voltage in accordance with one illustrative embodiment.

FIG. 3 is an example plot of current from drain to source of a CNT-based FET for a given voltage in accordance with one illustrative embodiment. The plot shown in FIG. 3 corresponds to the bias voltage across the gate Vg being at −3V in FIG. 2. As shown in FIG. 3, the distribution of currents $I_{ds}$ for a specific bias voltage across the gate $V_g$ of −3V ranges from 6 µA to 10.5 µA. From viewing the plots of FIG. 2 and FIG. 3, it is apparent that the CNT-based FET provides a sufficient amount of randomness with output current $I_{ds}$ to be a valid physical process source for generating a random value, i.e. a valid physical entropy source. In some illustrative embodiments, the mechanisms of the illustrative embodiments utilize this large random output current as the source to generate a random "1" or "0" output, as described hereafter.

Figure 4:
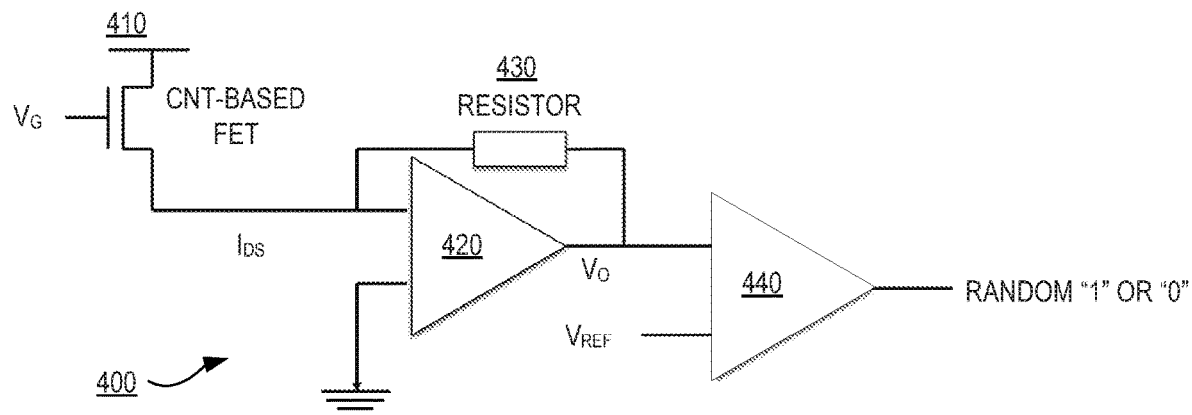
FIG. 4 is an example diagram of one example circuit implementation of a random value generator using a CNT-based physical entropy source in accordance with one illustrative embodiment.

FIG. 4 is an example diagram of one example circuit implementation of a random value generator using a CNT-based physical entropy source in accordance with one illustrative embodiment. It should be appreciated that FIG. 4 is only one example of a circuit that may be used to generate a random output based on the physical randomness characteristics of a CNT-based FET or other physical entropy source. Many modifications to the circuit shown in FIG. 4 may be made without departing from the spirit and scope of the present invention.

As shown in FIG. 4, a CNT-based physical entropy source 410 is coupled to an operational amplifier (op amp or simply "amplifier") 420 and resistor 430 which converts the output current from the CNT-based physical entropy source 410 to a voltage output. That is, in the example shown in FIG. 4, the CNT-based physical entropy source 410 is a CNT-based FET such as that shown in FIG. 1, for example. It should be appreciated that the CNT-based FET is only one example of a CNT-based physical entropy source that may be used with the mechanisms of the illustrative embodiments and other CNT-based physical entropy sources 410 may be used without departing from the spirit and scope of the present invention. With an example implementation in which the CNT-based physical entropy source 410 is implemented as a CNT-based FET, the CNT-based physical entropy source 410 generates a random current output $I_{ds}$ based on the bias voltage Vg across the gate of the CNT-based FET 410 by virtue of the physical properties of the CNT element of the CNT-based FET 410 and the configuration shown in FIG. 1. This random current $I_{ds}$ is output to the amplifier 420 and resistor 430 to thereby convert the output current $I_{ds}$ to a voltage output $V_o$ that is provided to comparator 440. The resistor 430 provides a feedback voltage to the input of the operational amplifier 420 to maintain the amplifier 420 operational long enough for the comparator 440 to perform the comparison of the voltage output $V_o$ with a reference voltage $V_{ref}$.

That is, the comparator 440 compares the output voltage $V_o$ from the amplifier 420 to a reference voltage $V_{ref}$ and generates an output, e.g., high/low or "1"/"0", depending on whether the output voltage $V_o$ is greater than or less than the reference voltage $V_{ref}$. Due to the output voltage $V_o$ being randomized as a result of the random current $I_{ds}$ input to the amplifier 420, the output of the comparator 440 is randomized. Thus, the comparator 440 outputs a random "1" or "0" value (high/low). Performing such an operation repeatedly provides a series of random "1" and "0" values which together may represent a random binary value that may be used as a random value input to a cryptographic operation or other operation that utilizes a random value input. With regard to a cryptographic operation, the random value generated by repeated operation of the circuit 400 shown in FIG. 4 may be used as a random key value, as a seed value, or any other randomized input value that may be utilized by the cryptographic operation to perform its cryptographic functions.

It should be appreciated that this cryptographic operation may be performed by cryptographic hardware, such as a cryptographic processor, co-processor, hardware circuitry, or the like, or a combination of cryptographic hardware and cryptographic software. Thus, the randomized output values of the circuit shown in FIG. 4 may be input to a cryptographic processor, hardware unit, or other type of cryptographic circuitry which may utilize the randomized value as an input for performing its functions within the hardware itself. Alternatively, the random output value may be processed by a processor programmed with cryptographic software that operates on the random output value to perform its cryptographic functions. Still further, a combination of both hardware and software cryptographic functions being performed using the random output value from the circuit shown in FIG. 4, or any modified form of the circuitry shown in FIG. 4, may also be utilized in accordance with the illustrative embodiments.

Moreover, while not shown in FIG. 4, there may be additional post-processing circuitry provided coupled to the output of the comparator 440 to facilitate additional operations for increasing randomness and/or making the output useful for downstream circuitry and/or software logic. For example, post processing circuitry may be provided for removing redundancy, such as a "digital corrector" based on the concept proposed by John von Neumann to remove redundancy in a stream of random bits. Such a corrector examines each and every pair of bits in the stream and produces one of 3 possible outputs based on the pair of bits:

| input bits | output bit |
|---|---|
| 0, 0 | none |
| 0, 1 | 1 |
| 1, 0 | 0 |
| 1, 1 | none | where "none" means "no output."

Figure 5:
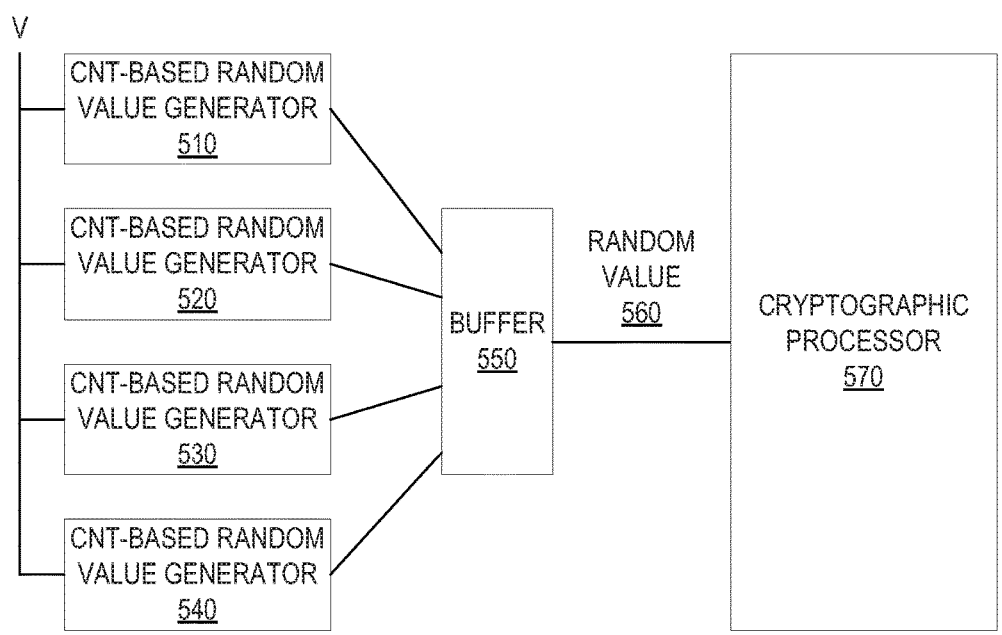
FIG. 5 is an example diagram of an array of CNT-based physical entropy sources in accordance with one illustrative embodiment.

Another post-processing design is to provide circuitry that holds the output bits in a buffer, such as buffer 550 in FIG. 5, and performs a cryptographic hash (such as SHA-2 and SHA-3) on the bits in the buffer 550. The output of the hash (called a digest) may then be used as random bits to crypto operations (or other operations that need random bits), such as in cryptographic processor 570.

As noted above, the output of the circuit in FIG. 4 generates a single randomized output value, e.g., a random "1" or "0", based on a single input voltage $V_g$ across the gate of the CNT-based FET 410. Thus, in order to be able to obtain a multi-bit random value, the operation of the circuit must be repeated to generate a sequence of random bits, i.e. a sequence of randomized 1's and 0's. This adds additional time for the circuit to operate to generate a useable random value. For example, in order to obtain a 32-bit random value, the operation of the circuit 400 must be repeated 32 times. Most known downstream operations, such as cryptographic operations and their circuitry/software, or the like, utilize random values that have many bits and thus, repeated operation of the circuitry 400 would be required to generate such multi-bit random values.

In order to reduce the repetitiousness of the operation of the circuitry shown in FIG. 4 needed in order to obtain a useful random value, in some illustrative embodiments, an array of circuits 400 such as that shown in FIG. 4 may be utilized in parallel so as to generate multiple random output values at approximately the same time. For example, 4 instances of the circuitry shown in FIG. 4 may be utilized to generate, during any one time point, 4 random output values, e.g., 4 random values that are either a "1" or a "0". In order to obtain a 32 bit random value in such a case, the operation of these 4 copies of the circuitry would need to be repeated only 8 times as opposed to 32 times with a single instance of the circuitry 400.

FIG. 5 is an example diagram of an array of CNT-based physical entropy sources in accordance with one illustrative embodiment. In FIG. 5, each of the CNT-based random value generators 510-540 is an instance of the circuitry 400 shown in FIG. 4. As shown in FIG. 5, each of the CNT-based random value generators 510-540 receives an input voltage V to their respective CNT-based physical entropy source, e.g., CNT-based FET. For example, an input gate voltage Vg across the gate of the CNT-based FET is input which causes the CNT-based FET to generate a random output current $I_{ds}$. Through the circuitry 400, each CNT-based random value generator 510-540 generates a random "1" or "0" that is output to the buffer 550. Each of the random values is a bit in a 32-bit random value. This operation is repeated 8 times to generate 32 bits stored in the buffer 550 which then outputs the 32-bit random value 560 as an input to the cryptographic processor 570. The cryptographic processor 570 then performs any known or later developed cryptographic operations based on the randomized input value 560. For example, the randomized input value 560 may be used to generate a random cryptographic key value for encrypting/decrypting data, to perform a keyed hash function for encrypting data, or the like.

It should be appreciated that while the example shown in FIG. 5 shows an array of four CNT-based random value generators 510-540, this was only chosen for illustration purposes and any number of multiple CNT-based random value generators may be used without departing from the spirit and scope of the present invention. The particular number of CNT-based random value generators 510-540 to use will be dependent upon the desired implementation taking into account various factors of design including, but not limited to, chip area taken up by the circuitry, speed at which the circuitry will operate, size of the random values that are to be generated, e.g., 32-bit values, 64-bit values, 128-bit values, etc., and the like. FIG. 5 is only an example and is not intended to state or imply any limitation with regard to the size or arrangement of an array of CNT-based random value generators that may be utilized within the scope of the present invention.

Figure 6:
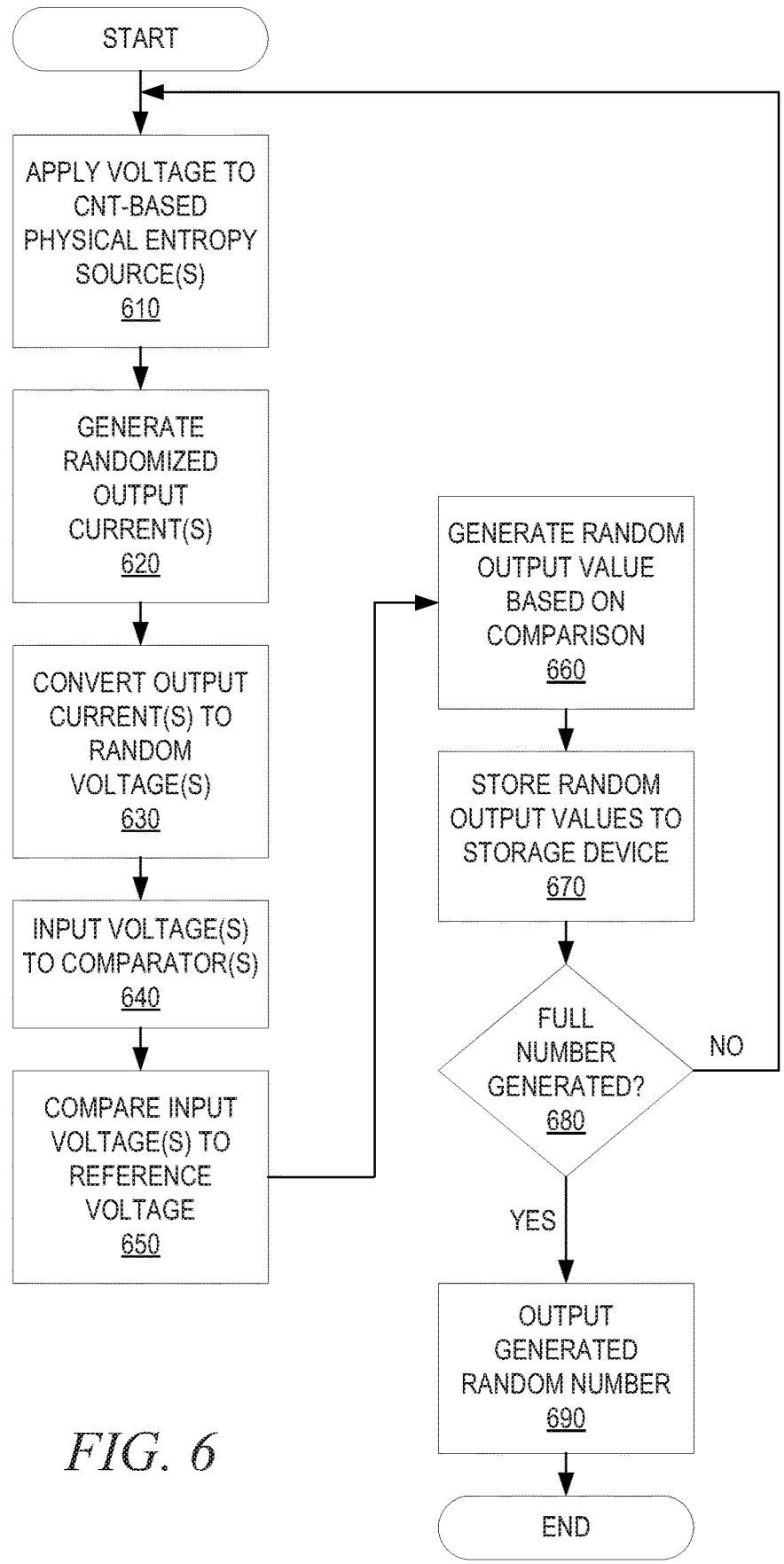
FIG. 6 is a flowchart outlining an example operation for utilizing a CNT-based physical entropy source to generate a random number in accordance with one illustrative embodiment in which a single CNT-based physical entropy source is utilized.

FIG. 6 is a flowchart outlining an example operation for utilizing a CNT-based physical entropy source to generate a random number in accordance with one illustrative embodiment in which a single CNT-based physical entropy source is utilized. The operation of a CNT-based random number generator (RNG) shown in FIG. 6 may be performed using a CNT-based physical entropy source circuit such as that shown in FIG. 4 or FIG. 5 as described above, or any other type of circuit that utilizes a CNT-based physical entropy source to generate the physical entropy input that is the basis for generating a random value.

A shown in FIG. 6, the operation starts by applying a voltage to one or more CNT-based physical entropy sources (step 610). The application of the voltage causes the CNT-based physical entropy source(s) to each generate a randomized output current (step 620). The randomized output current(s) are converted to a random voltage(s) (step 630) which are input to one or more comparators (step 640). The comparator(s) each compare the random voltage that is input to the comparator to a reference voltage (step 650). Based on results of the comparison, a random value is output by the comparator, e.g., a "1" or a "0" (step 660) and stored in a storage device, such as a buffer for example, for use by a downstream hardware device (step 670).

A determination is made as to whether a sufficient number of random values have been output, e.g., if a 32-bit output value is to be generated, this determination may be a determination as to whether all 32-bits have been generated (step 680). This determination may be a determination that is passively performed such as by filling the storage device, e.g., buffer. Once the storage device is full, the values stored in the storage device are output as the random value, e.g., once all 32-bits exist in the buffer and thus, the buffer becomes full, the 32-bit random value is output as the random value generated by the CNT-based random number generator (RNG). If the determination is that a sufficient number of random values have not been generated, then the operation returns to step 610. Otherwise, the operation outputs the random number generated by the operation of the CNT-based RNG (step 690) and the operation terminates.

Figure 7:
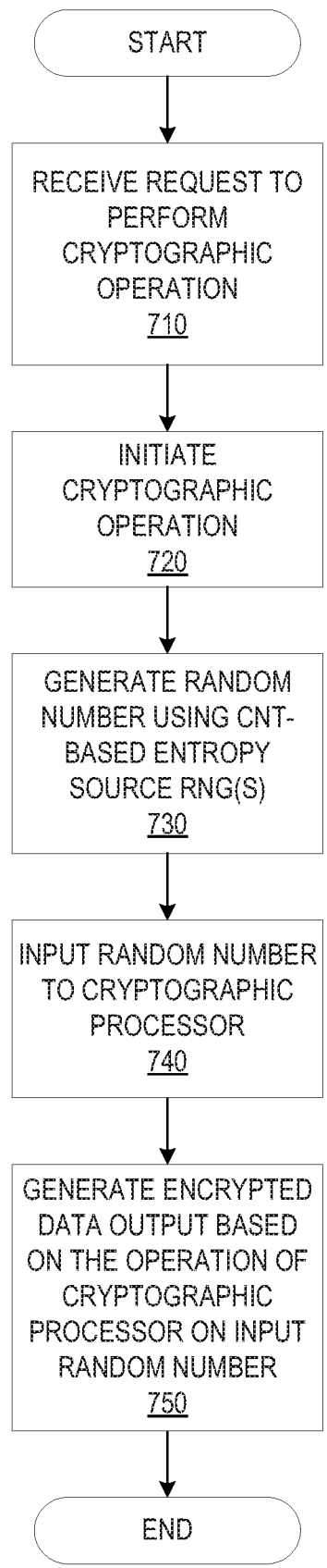
FIG. 7 is a flowchart outlining an example operation for utilizing a CNT-based physical entropy source to generate a random number input and perform a cryptographic operation based on the random number input in accordance with one illustrative embodiment.

FIG. 7 is a flowchart outlining an example operation for utilizing a CNT-based physical entropy source to generate a random number input and perform a cryptographic operation based on the random number input in accordance with one illustrative embodiment. FIG. 7 shows one example implementation of an illustrative embodiment in which the random number generated by a CNT-based RNG is used as a basis for performing a cryptographic operation in accordance with one illustrative embodiment. As noted above, the illustrative embodiments may be used with any operation that is based on an input that is a randomized input, with cryptographic operations being only one example, and the particular cryptographic operation described in FIG. 7 being only one example of a cryptographic operation.

As shown in FIG. 7, the operation starts by receiving a request to perform a cryptographic operation (step 710). This request may be an automatically generated request in response to an event, such as receipt of data to be encrypted for example, or may be a user generated event, such as a request to encrypt a message before sending, or the like. In response to the request being received, a cryptographic operation is initiated (step 720) which causes a random number to be generated upon which the cryptographic operation is based (step 730). The random number is generated using a CNT-based physical entropy source random number generator (RNG) in accordance with one or more of the illustrative embodiments previously described above. The random number generated by the CNT-based RNG is input to a cryptographic processor (step 740) which, depending on the particular cryptographic functions being implemented by the cryptographic processor, utilizes the random number to generate an encrypted data output (step 750). The operation then terminates.

Figure 8:
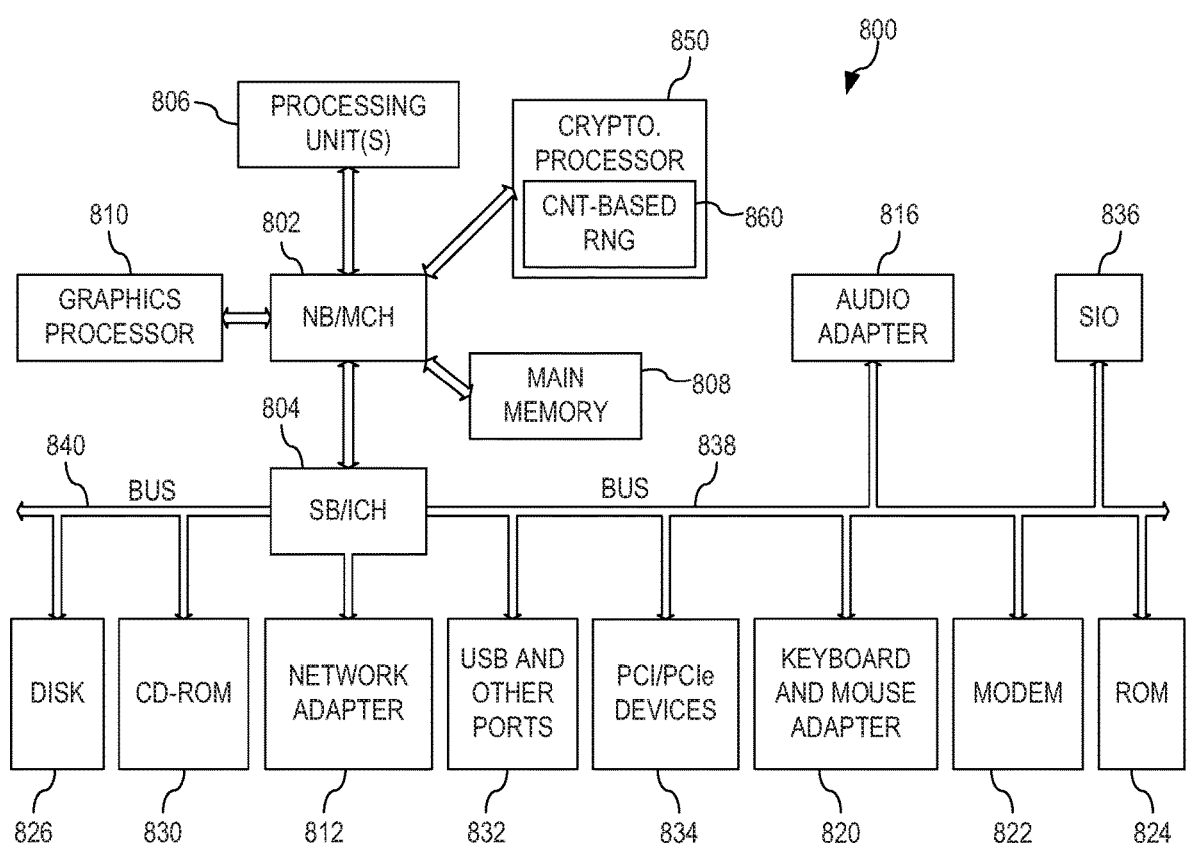
FIG. 8 is an example block diagram of an example computing device in which the CNT-based physical entropy source may be utilized.

FIG. 8 is an example block diagram of an example computing device in which the CNT-based physical entropy source may be utilized. Data processing system 800 is an example of a computer in which computer usable code or instructions implementing processes that utilize a random number input as a basis for performing these processes is provided. In the depicted example, the cryptographic processor 850 is provided which includes one or more CNT-based random number generators (RNGs) 860 in accordance with one or more of the illustrative embodiments described above. While FIG. 8 is shown with the cryptographic processor 850 being the element that utilizes the random number generated by the CNT-based RNG 860 for purposes of cryptographic functions, as noted above, this is just an example and many other hardware devices and/or software operations/functions may make use of random numbers or values generated by the CNT-based random number/value generators of the illustrative embodiments. For example, software may be loaded and executed on processing units 806 that make use of a random number or value generated by the CNT-based RNG 860 or other suitable CNT-based random value generation circuitry.

In the depicted example, data processing system 800 employs a hub architecture including north bridge and memory controller hub (NB/MCH) 802 and south bridge and input/output (I/O) controller hub (SB/ICH) 804. Processing unit 806, main memory 808, and graphics processor 810 are connected to NB/MCH 802. Graphics processor 810 is connected to NB/MCH 802 through an accelerated graphics port (AGP).

In the depicted example, local area network (LAN) adapter 812 connects to SB/ICH 804. Audio adapter 816, keyboard and mouse adapter 820, modem 822, read only memory (ROM) 824, hard disk drive (HDD) 826, CD-ROM drive 830, universal serial bus (USB) ports and other communication ports 832, and PCI/PCIe devices 834 connect to SB/ICH 804 through bus 838 and bus 840. PCI/PCIe devices may include, for example, Ethernet adapters, add-in cards, and PC cards for notebook computers. PCI uses a card bus controller, while PCIe does not. ROM 824 may be, for example, a flash basic input/output system (BIOS).

HDD 826 and CD-ROM drive 830 connect to SB/ICH 804 through bus 840. HDD 826 and CD-ROM drive 830 may use, for example, an integrated drive electronics (IDE) or serial advanced technology attachment (SATA) interface. Super I/O (SIO) device 836 is connected to SB/ICH 804.

An operating system runs on processing unit 806. The operating system coordinates and provides control of various components within the data processing system 800 in FIG. 8. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 800.

As a server, data processing system 800 may be, for example, an IBM® eServer™ System p° computer system, running the Advanced Interactive Executive) (AIX®) operating system or the LINUX® operating system. Data processing system 800 may be a symmetric multiprocessor (SMP) system including a plurality of processors in processing unit 806. Alternatively, a single processor system may be employed.

Instructions for the operating system, the object-oriented programming system, and applications or programs are located on storage devices, such as HDD 826, and are loaded into main memory 808 for execution by processing unit 806. The processes for illustrative embodiments of the present invention are performed by processing unit 806 using computer usable program code, which is located in a memory such as, for example, main memory 808, ROM 824, or in one or more peripheral devices 826 and 830, for example.

A bus system, such as bus 838 or bus 840 as shown in FIG. 8, is comprised of one or more buses. Of course, the bus system may be implemented using any type of communication fabric or architecture that provides for a transfer of data between different components or devices attached to the fabric or architecture. A communication unit, such as modem 822 or network adapter 812 of FIG. 8, includes one or more devices used to transmit and receive data. A memory may be, for example, main memory 808, ROM 824, or a cache such as found in NB/MCH 802 in FIG. 8.

Those of ordinary skill in the art will appreciate that the hardware depicted in FIG. 8 may vary depending on the implementation. Other internal hardware or peripheral devices, such as flash memory, equivalent non-volatile memory, or optical disk drives and the like, may be used in addition to or in place of the hardware depicted in FIG. 8. Also, the processes of the illustrative embodiments may be applied to a multiprocessor data processing system, other than the SMP system mentioned previously, without departing from the spirit and scope of the present invention.

Moreover, the data processing system 800 may take the form of any of a number of different data processing systems including client computing devices, server computing devices, a tablet computer, laptop computer, telephone or other communication device, a personal digital assistant (PDA), or the like. In some illustrative examples, data processing system 800 may be a portable computing device that is configured with flash memory to provide non-volatile memory for storing operating system files and/or user-generated data, for example. Essentially, data processing system 800 may be any known or later developed data processing system without architectural limitation.

The CNT-based random number/value generator circuitry of the illustrative embodiments may be implemented as part of an integrated circuit chip and integrated circuit chip design. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

Figure 9:
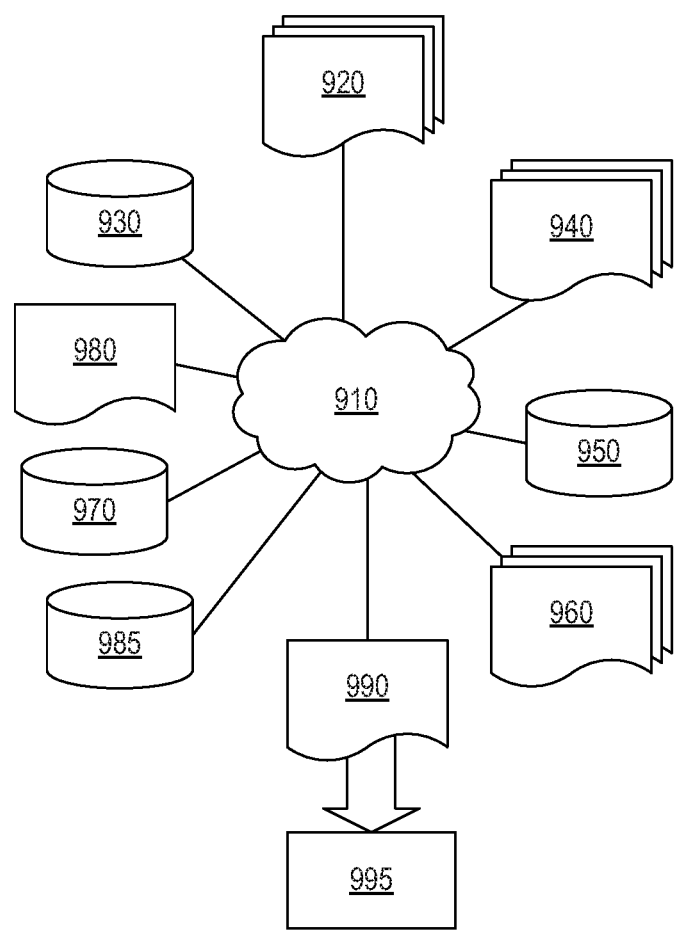
FIG. 9 shows a block diagram of an exemplary design flow used for example, in semiconductor design, manufacturing, and/or test, in accordance with one illustrative embodiment.

FIG. 9 shows a block diagram of an exemplary design flow 900 used for example, in semiconductor design, manufacturing, and/or test. Design flow 900 may vary depending on the type of IC being designed. For example, a design flow 900 for building an application specific IC (ASIC) may differ from a design flow 900 for designing a standard component. Design structure 920 is preferably an input to a design process 910 and may come from an IP provider, a core developer, or other design company or may be generated by the operator of the design flow, or from other sources. Design structure 920 comprises an embodiment of the invention as shown in one or more of FIGS. 1, 4, and/or 5 in the form of schematics or HDL, a hardware-description language (e.g., Verilog, VHDL, C, etc.). Design structure 920 may be contained on one or more machine readable medium. For example, design structure 920 may be a text file or a graphical representation of an embodiment of the invention as shown in FIGS. 1, 4, and/or 5. Design process 910 preferably synthesizes (or translates) an embodiment of the invention as shown in FIGS. 1, 4, and/or 5 into a netlist 980, where netlist 980 is, for example, a list of wires, transistors, logic gates, control circuits, I/O, models, etc. that describes the connections to other elements and circuits in an integrated circuit design and recorded on at least one of machine readable medium. This may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention. The design structure of the invention is not limited to any specific design flow.

Design process 910 preferably translates an embodiment of the invention as shown in FIGS. 1, 4, and/or 5, along with any additional integrated circuit design or data (if applicable), into a second design structure 990. Design structure 990 resides on a storage medium in a data format used for the exchange of layout data of integrated circuits (e.g. information stored in a GDSII (GDS2), GL1, OASIS, or any other suitable format for storing such design structures). Design structure 990 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 4, and/or 5. Design structure 990 may then proceed to a stage 995 where, for example, design structure 990: proceeds to tape-out, is released to manufacturing, is released to a mask house, is sent to another design house, is sent back to the customer, etc.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

Thus, the illustrative embodiments provide mechanisms for generating a random value based on the use of a carbon nanotube structure as an entropy source for generating a randomized electrical current as a basis for generating the random value. The mechanisms of the illustrative embodiments provide a non-predictable source upon which various operations and functions may be performed. For example, the carbon nanotube structure may be used as a random number generator (RNG) upon which cryptographic operations or functions are based. In this way, the cryptographic operations or functions are made stronger by providing a source whose value is not predictable by outside viewers or interlopers. Moreover, due to the size of the circuitry involved in the carbon nanotube structures, any attempt by an interloper to reverse engineer the structures would result in destruction of the structures before valuable information may be obtained.

It should be appreciated that while the present invention has been described above with regard to the CNT-based physical entropy sources being used to generate random numbers, the illustrative embodiments are not limited to such. To the contrary, the CNT-based physical entropy sources of the present invention may be used to generate any random output that is suitable for performing a downstream operation of function by other hardware and/or software logic. For example, the CNT-based physical entropy sources may be used as a basis for generating random values comprising alphanumeric characters, e.g., random strings of characters. Generally speaking, the mechanism can be used to generate any random stream of symbols, where a symbol may be a 1-bit of 0 or 1, or a symbol may require multiple bits to encode, such as an English or Chinese character.

The essence is that the mechanisms of the illustrative embodiments generate a stream of random bits, and the stream of bits can be interpreted according to some encoding rule. In this sense, a bit may be binary (1 or 0), or the bit may be multi-valued (such as 0, 1, or 2). For example, in FIG. 4 if the output voltage Vo is fed to two comparators, one with reference voltage Vref1 and the other with Vref2, Vref1>Vref2, then the output can be: 2 if Vo>Vref1; 1 if Vref2<Vo<Vref1; and 0 if Vo<Vref2. Once there is a random output voltage Vo, Vo could be interpreted in many different ways by the subsequent circuitry. The current FIG. 4 shows one example of a binary interpretation, but as noted above, there are a plethora of other possibilities.

As mentioned above, while the illustrative embodiments described above mainly focus on the use of the CNT-based physical entropy source mechanisms to provide random values for use in cryptographic operations, the illustrative embodiments are not limited to such. Rather, any operation that relies on, or can be improved by, the use of a randomly generated input may utilize the mechanisms of the illustrative embodiments as a basis for providing the randomized input. For example, many applications exist in the field of gambling devices, such as electronic slot machines, electronic poker machines, and the like, where random number generators are utilized as a basis for performing various operations. Moreover, in physics, chemistry, engineering, computer science, and social science, many models and operations rely on a randomly generated input, e.g., the famous Monte-Carlo simulation. Other applications may involve statistical sampling and the like. The variety and number of operations that may be improved by implementing the random number or random input generation mechanisms of the illustrative embodiments is too vast to set forth all possible implementations herein. However, any implementation of any operation that operates on a randomly generated input or random number/value is intended to be within the spirit and scope of the present invention.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A random value generator, comprising:
   a carbon nanotube structure that generates a random output current in response to a voltage input; and
   a random value output circuit coupled to the carbon nanotube structure that receives the random output current from the carbon nanotube structure and generates a random output value based on the received random output current from the carbon nanotube structure, wherein the random value output circuit comprises:
   a first circuit to convert the random output current to a random voltage; and
   a second circuit to compare the random voltage to at least one reference voltage and generate an output based on results of the comparison.

2. The random value generator of claim 1, wherein the carbon nanotube structure comprises at least one carbon nanotube field effect transistor (CNT-FET).

3. The random value generator of claim 1,
   wherein the output is at least one portion of the random output value.

4. The random value generator of claim 1, wherein the random output value comprises at least one random bit value, and wherein the random value generator further comprises:
   an output connection connecting the random value generator to a logic element that converts the at least one random bit value to a symbolic output.

5. The random value generator of claim 1, wherein the carbon nanotube structure generates a different random output current in response to a repeated application of a same voltage input.

6. The random value generator of claim 2, wherein the at least one CNT-FET comprises a plurality of CNT-FETs, and wherein each CNT-FET in the plurality of CNT-FETs comprises a carbon nanotube positioned between a dielectric and a gate, and wherein, for each CNT-FET in the plurality of CNT-FETs, a first end of the carbon nanotube is associated with a corresponding source and a second end of the carbon nanotube is associated with a corresponding drain.

7. The random value generator of claim 2, wherein the at least one CNT-FET comprises a plurality of CNT-FETs arranged in parallel, and wherein each CNT-FET in the plurality of CNT-FETs outputs a separate random value which is combined with other random values of other CNT-FETs in the plurality of CNT-FETs to generate the random output value.

8. The random value generator of claim 6, wherein, for each CNT-FET in the plurality of CNT-FETs, in response to the voltage input being applied to the gate of the CNT-FET, the carbon nanotube generates a random current output due to sensitivity of the carbon nanotube to trap charges absorbed by the dielectric near or on a surface of the carbon nanotube.

9. An apparatus, comprising:
   at least one random value generator; and
   a logic circuit element coupled to the at least one random value generator, wherein the logic circuit element receives a random value output from the at least one random value generator and performs an operation based on the random value output, and wherein each of the at least one random value generator comprises:
   a carbon nanotube structure that generates a random output current in response to a voltage input; and
   a random value output circuit coupled to the carbon nanotube structure that receives the random output current from the carbon nanotube structure and generates a random output value based on the received random output current from the carbon nanotube structure, wherein the random value output circuit comprises:
   a first circuit to convert the random output current to a random voltage; and
   a second circuit to compare the random voltage to at least one reference voltage and generate an output based on results of the comparison.

10. The apparatus of claim 9, wherein the carbon nanotube structure comprises at least one carbon nanotube field effect transistor (CNT-FET).

11. The apparatus of claim 9,
    wherein the output is at least one portion of the random output value.

12. The apparatus of claim 9, wherein the random output value comprises at least one random bit value.

13. The apparatus of claim 9, wherein the logic circuit element comprises a cryptographic processor that performs a cryptographic operation based on the random output value generated by the at least one random value generator.

14. The apparatus of claim 10, wherein the at least one CNT-FET comprises a plurality of CNT-FETs, and wherein each CNT-FET in the plurality of CNT-FETs comprises a carbon nanotube positioned between a dielectric and a gate, and wherein, for each CNT-FET in the plurality of CNT-FETs, a first end of the carbon nanotube is associated with a corresponding source and a second end of the carbon nanotube is associated with a corresponding drain.

15. The apparatus of claim 10, wherein the at least one CNT-FET comprises a plurality of CNT-FETs arranged in parallel, and wherein each CNT-FET in the plurality of CNT-FETs outputs a separate random value which is combined with other random values of other CNT-FETs in the plurality of CNT-FETs to generate the random output value.

16. The apparatus of claim 14, wherein, for each CNT-FET in the plurality of CNT-FETs, in response to the voltage input being applied to the gate of the CNT-FET, the carbon nanotube generates a random current output due to sensitivity of the carbon nanotube to trap charges absorbed by the dielectric near or on a surface of the carbon nanotube.

17. A method, in an integrated circuit device, for performing a logic operation based on a randomized output, the method comprising:

applying a voltage to a carbon nanotube (CNT) based physical entropy source to generate a randomized current output;

generating, by a circuit coupled to the CNT based physical entropy source, a random output value based on the generated randomized current output received from the CNT based physical entropy source; and inputting, by the logic circuit, the randomized output to a logic circuit element that performs a logic operation based on the randomized output, wherein generating the random output value comprises:

converting, by an operational amplifier of the circuit, the randomized current output to a randomized output voltage;

comparing, by a comparator coupled to the operational amplifier, the randomized output voltage to at least one reference voltage and generate an output signal based on results of the comparison.

18. The method of claim 17, wherein the output signal represents at least a portion of the random output value.

19. The method of claim 17, wherein the carbon nanotube structure comprises a plurality of carbon nanotube field effect transistors (CNT-FETs), and wherein each CNT-FET in the the plurality of CNT-FETs comprises a carbon nanotube positioned between a dielectric and a gate, and wherein, for each CNT-FET in the plurality of CNT-FETs, a first end of the carbon nanotube is associated with a corresponding source and a second end of the carbon nanotube is associated with a corresponding drain.

20. The method of claim 17, wherein the logic circuit element is a cryptographic processor, and wherein the logic operation comprises generating a random cryptographic key value for at least one of encrypting or decrypting data based on the randomized output.

21. The method of claim 19, wherein the plurality of CNT-FETs are arranged in parallel, and wherein each CNT-FET in the plurality of CNT-FETs outputs a separate random value which is combined with other random values of other CNT-FETs in the plurality of CNT-FETs to generate the random output value.

* * * * *